Apr. 3, 1923.

T. H. GRIFFITH

BED

Filed Jan. 24, 1922

INVENTOR:
Thomas H. Griffith
BY
Allen & Allen
ATTORNEYS.

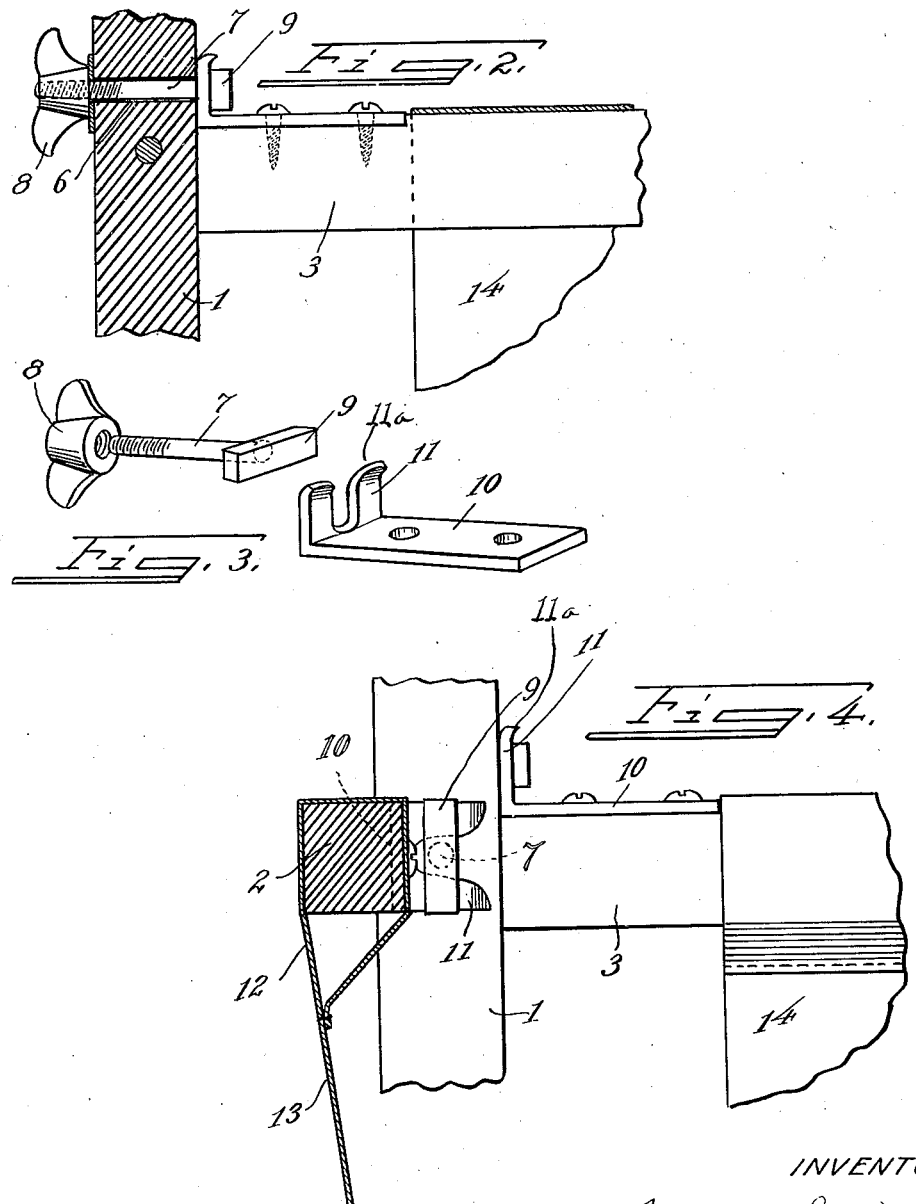

Patented Apr. 3, 1923.

1,450,497

UNITED STATES PATENT OFFICE.

THOMAS H. GRIFFITH, OF CINCINNATI, OHIO.

BED.

Application filed January 24, 1922. Serial No. 531,475.

*To all whom it may concern:*

Be it known that I, THOMAS H. GRIFFITH, a citizen of the United States, and a resident of Cincinnati, in the county of Hamilton and State of Ohio, have invented certain new and useful Improvements in Beds, of which the following is a full, clear, and exact description, reference being had to the accompanying drawings, forming part of this specification.

My invention relates to beds principally for infants, and has as its chief object the provision of a baby's bed which can be easily taken apart, folded up and carried from one place to another.

In my Patent No. 1,385,045, dated July 19, 1921, I show and describe a bed built along the same lines as the one forming the basis of this present invention, and the object of my invention forming the basis of this application is the arrangement for easy adjustability and greater simplicity of manufacture in such beds.

To this end I provide a certain new and useful arrangement of bolts and hooks, whereby the tautness of the canvas frame may be quickly adjusted. This bolt and hook arrangement is also a very simple means of mounting the side and end bars of the bed frame to the uprights.

The above objects and advantages I accomplish by that certain construction and arrangement of parts to be hereinafter more specifically pointed out and claimed.

In the drawings,

Figure 2 is a detail section showing one of the bolt and hook devices.

Figure 3 is a perspective view showing the bolt and hook plates separately.

Figure 4 is an elevation showing a partial adjustment of one of the side bars on a corner post.

Figure 1:
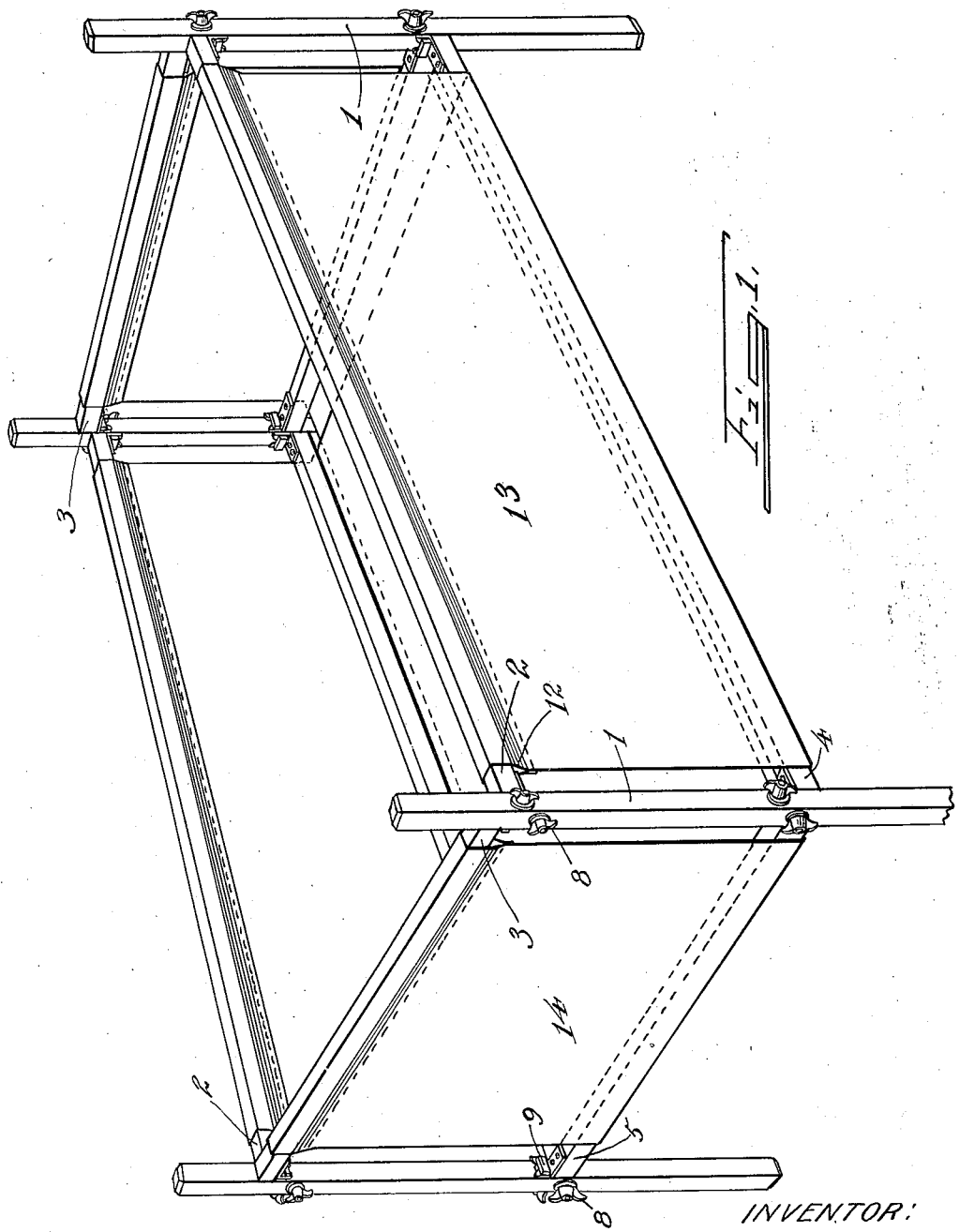
Figure 1 is a perspective view of a complete bed built according to my invention.

The frame of the bed is made up of four corner posts 1. There are two upper side bars 2 and two upper end bars 3. There are also two lower side bars 4 and two lower end bars 5.

I have shown a uniform system of mounting all bars, which, of course, might be varied, although for purposes of economy this is naturally not desirable.

Thus I provide in the corner posts for bolt holes 6 at each level for two bolts, i. e., there will be four bolt holes in each post, two above and two below, and the holes of each set of two will be at right angles to each other.

Into these holes are set bolts having shanks 7, wing nuts 8 and cross pins 9, forming T-shaped heads. The side and end bars have screwed thereon in any suitable way the plates 10, which have forked flanges 11 turned up therefrom, said flanges having their ends bent as at 11ª.

In assembling the bars and posts, the bolts are inserted in the post holes and the wing nuts mounted thereon, and the hooks on the bars hooked down over the shanks of the bolts with the T heads lying beyond the hooks. The wing nuts are then tightened, which clamps the hooks between the T heads and the sides of the posts. As shown in Figure 1, the top bars are usually arranged with the hooks on the plates extending downwardly, although they may extend in from the sides, as shown in Figure 4, or up from below, as shown in Figure 2. The position of the bottom bars will be adjusted to take up the slack of the fabric structure, as will be noted.

For the balance of the bed, the two top side bars are inserted in the hems or tunnels 12, of the fabric strip 13, and the two top end bars into like hems in the fabric strip 14. The insertion of the said bars into the said hems will be accomplished before setting up the bed, and by preference the operator will first arrange the four bottom cross bars in place and bolt them tightly. He will then bolt down the top side bars so that the fabric thereon will pass down and around the two bottom side bars, and will then bolt the end top bars into the frame, passing the fabric piece secured thereto down and around the bottom end bars underneath the other piece of fabric.

There will be provided by the above, a base and four sides for a small crib or bed, in which any of the mounting and stretching bars may be revolved on its mounting after first loosening the bolts, so that it takes a position to take up slack that may have developed through stretching of the fabric.

Turning all four bottom bars around from a position with the hooks on the mounting plates down to a position with them extending up, will impart quite a take-up to the fabric passed around the frame.

The frictional grasp of the bolts on the hook plates and the presence of the turnedin ends or hook-like portions 11ª will easily support any weight that the frame will hold, even if all the hooks in the bed are turned upwardly.

I have dealt with the advantages generally of the bed structure in my patent above noted, and wish to call attention to the fact that the bed described above can be rolled into a thin, narrow roll, as in said patent. In fact, the package formed by the bed, when rolled up, with the sticks inside the canvas or fabric parts, can be shipped in a carton five and one half inches square and three and one half feet long.

Having thus described my invention, what I claim as new and desire to secure by Letters Patent, is:—

1. A means for mounting a fabric retaining bar in devices of the character described, comprising a bolt in one member having a nut at one end and a fixed T-shaped head on the other end, and a hook-shaped element on the other member adapted to straddle the bolt shank behind the T-shaped head, for the purpose described.

2. In a baby crib or the like, the combination with corner posts, of side and end bars, said bars having strips of fabric secured thereto for the topmost set, and the lowermost set adapted to form a stretching frame for the fabric strips, said bars having an eccentric pivotal mounting to the corner posts, bolts in the corner posts, plates on the bars having hooks to engage over the shanks of the bolts, and heads for the bolts to lie against the hooks and having a T-shape, as and for the purpose described.

THOMAS H. GRIFFITH.